June 19, 1934.  H. SINCLAIR  1,963,720
HYDRAULIC COUPLING
Filed Jan. 8, 1931   2 Sheets-Sheet 1
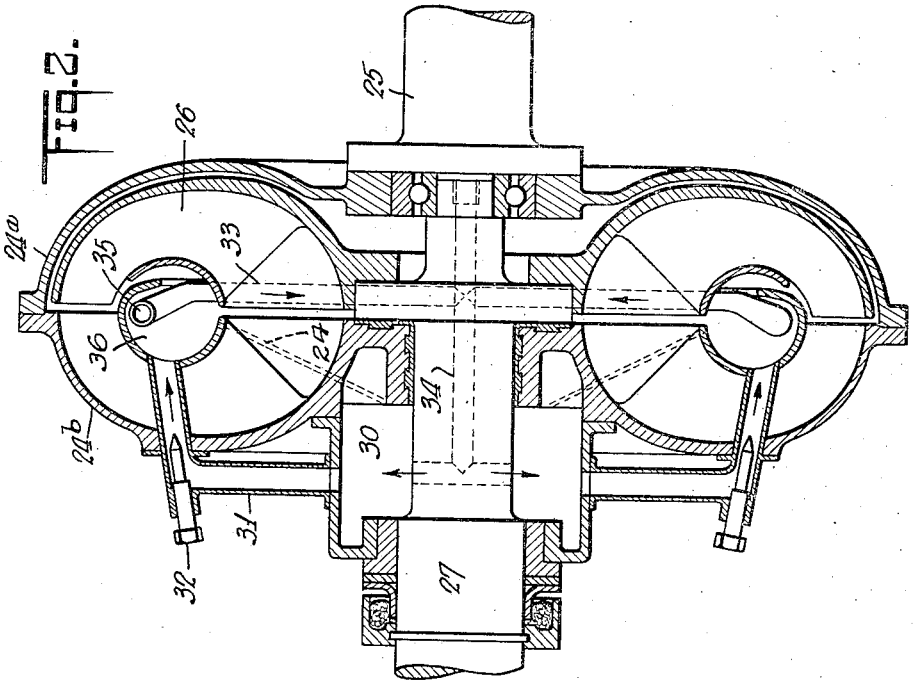
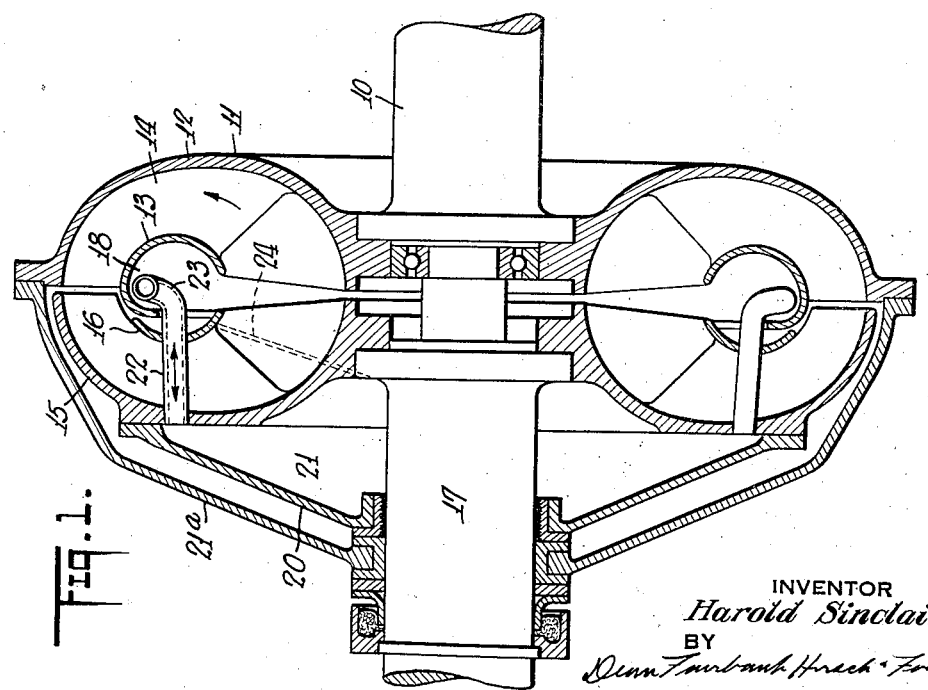
INVENTOR
*Harold Sinclair*
BY
ATTORNEYS June 19, 1934.  H. SINCLAIR  1,963,720
HYDRAULIC COUPLING
Filed Jan. 8, 1931  2 Sheets-Sheet 2
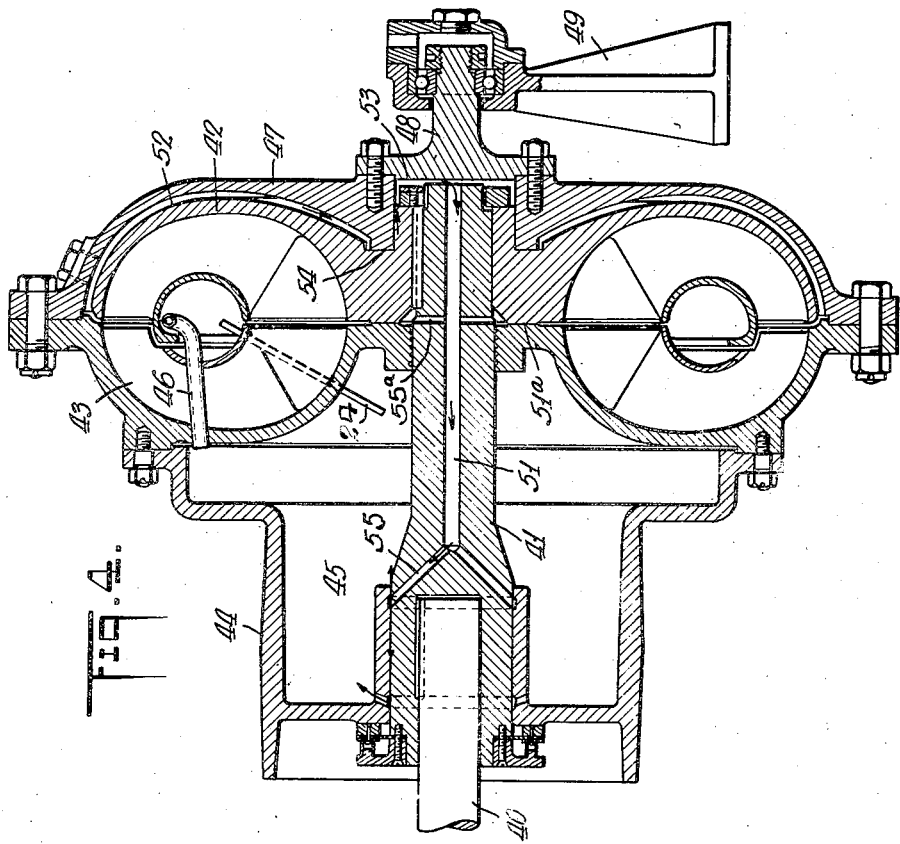
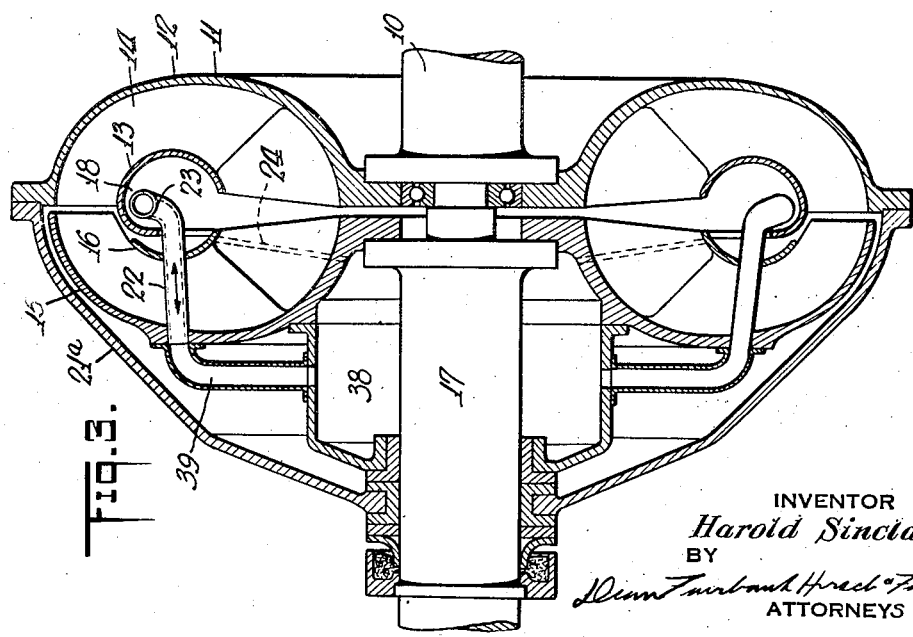
INVENTOR
*Harold Sinclair*
BY
*Dean Fairbank Hirsch & Foster*
ATTORNEYS Patented June 19, 1934

1,963,720

UNITED STATES PATENT OFFICE 1,963,720

HYDRAULIC COUPLING

Harold Sinclair, Surbiton, Surrey, England

Application January 8, 1931, Serial No. 507,356
In Germany November 27, 1930

32 Claims. (Cl. 60—54)

The present invention relates to hydraulic couplings having a driving member and a driven member, in which during the working operation the liquid circulates constantly in a circuit, passing out of the driving member into the driven member of the coupling and therethrough back into the driving member, power being transmitted through the agency of the kinetic energy of the circulating liquid. One such construction is shown and broadly claimed in the Föttinger Patent 1,199,359, of Sept. 26, 1916. In this type of coupling it is common to provide a ring core around which the liquid circulates within the coupling. The working liquid may be continuously enclosed within the coupling or the coupling may be connected to an outside reservoir and the liquid delivered thereto and discharged therefrom as required or desired.

With a hydraulic coupling of normal proportions, it is the well known general characteristic that the slip is high at low revolutions of the driving shaft, and that the slip rapidly decreases to a low value (assuming the torque to remain constant) when the revolutions of the driving shaft are increased.

In hydraulic couplings which serve in particular for the driving of vehicles having internal combustion engines, locomotives, cranes, power shovels, or the like, it is desirable that for normal and high revolutions the losses of power through the couplings shall be as small as possible, that is to say, that the slip shall be very small, so as to transmit as completely as possible the whole of the power from the driving shaft to the driven shaft and thereby secure a favorable utilization of the driving power. On the other hand, however, the slip must be very high at low revolutions and correspondingly the torque transmitted must then be very low, so as to allow the engine to continue to run slowly while the driven half of the coupling is at a standstill, that is with 100% slip.

The first case requires in effect that the coupling shall be of relatively large dimensions, while for the latter case the coupling in effect must be as small as is practicable, and it follows that the size of coupling selected must be a compromise between these opposing conditions and meets neither of them perfectly.

For example, if a coupling of large size is used to give high efficiency at full speed, it will have an undesirably high torque transmission when the engine is idling with the driven shaft stalled. A further disadvantage of the oversized coupling results from the fact that when the engine throttle is then opened up, the coupling prevents the engine from running fast enough to develop its full torque with the consequence that the acceleration is relatively low for a few moments.

One object of this invention is to provide a coupling which fulfills both of the extreme aforesaid requirements as well as the intermediate running conditions.

A further object is to provide a coupling whose slip is automatically changed so that its slip characteristic approaches the slip characteristic of a larger coupling at high revolutions, and approaches the slip characteristic of a smaller coupling at low revolutions.

To accomplish these objects I automatically reduce the kinetic energy imparted by the fluid flowing from the driving to the driven member as the relative difference in the speeds of the driving and driven members increases, and increase the kinetic energy of said fluid as the speed of the driven member increases and approaches that of the driving member.

The kinetic energy may be automatically varied by a suitably controlled obstruction, by-pass, valve or other member in the path of flow of the fluid or by varying the angle of the vanes against which the liquid reacts. It is varied in a simpler and more advantageous manner by varying the quantity of fluid in the operating circuit in accordance with the speeds of the members and more particularly the relative speeds of said members.

In the various embodiments hereinafter described there is provided a reservoir associated with and rotatable with one of the members and connected to the working chamber by means which act to deliver fluid to the reservoir from the working circuit, or from the working circuit to the reservoir under varying operating conditions. With the members rotating at substantially the same high speed the working circuit is filled to the maximum extent. With the driven member stalled or nearly stalled the fluid is to a large extent in the reservoir. Upon accelerating the driving member and the starting of the driven member the amount of fluid in the working circuit automatically increases as the speed of the driven member increases and approaches that of the driving member.

For discharging the fluid from the working chamber the driven member is provided with an ejecting conduit whose inlet end, which may constitute a scoop, is disposed in such a position that it is in the path of the fluid in movement within the driving member, so that when the speed of rotation of the driving member and the conduit are the same there may be little or no discharging action, but such action or tendency increases with increased difference in the relative speeds of the members, that is, with increased slip in the coupling. The action of centrifugal force on the liquid in the reservoir (or the driven half) tends to counteract the discharging action and when this force exceeds this discharging force fluid is not removed from the working circuit.

The emptying of the circuit is designed to take place only to such an extent and the dimensions of the reservoir chamber are so selected, that firstly the amount of fluid in the circuit is sufficient to give a predetermined relationship between the torque and speed when the driving part is running and the driven part is held stationary, and furthermore when the driven part commences to rotate, the working circuit which is then partially empty commences to refill so that the slip rapidly decreases to a very low value. In the converse sense it follows that the decrease of revolutions together with increase of torque will result in an increase of the slip i. e. the difference of revolutions between the driving and driven parts will become greater so that the working circuit will commence to empty into the reservoir chamber and in consequence a further rapid increase of slip will occur. Thus when the driven part comes to rest with the engine idling the torque transmitted will be lower than with a normal coupling because of the partial emptying of the working circuit. The reservoir chamber may be arranged on the driven or the driving portion of the coupling and the connecting channels open into or in the vicinity of the external diameter of the reservoir chamber, so that the fluid may be discharged therefrom by centrifugal force.

The arrangement may conveniently be such that conduits are provided for transferring the working liquid from the working chamber to the reservoir chamber and independently of these, separate channels are provided for supplying the working liquid from the reservoir chamber to the working circuit. Suitable pipes for displacement of air are provided leading, for example, from the inner guide ring chamber to the center or approximately the center of the reservoir chamber. In order to regulate the rate of liquid transfer into or from the working chamber throttling devices, such as needle valves or the like, may be provided in the connecting ports or the sizes of the latter may be proportioned to control the flow as desired.

Another example of the advantageous adaptation of this type of coupling is its use with A. C. electric motors and similar prime movers having high starting current and/or low starting torque capacity.

When a prime mover such as an asynchronous A. C. motor is required to start a loaded shaft, either the motor is unable to develop sufficient torque or the starting current under these conditions is excessive.

A common expedient is to use a centrifugal friction clutch by which the motor is permitted to accelerate freely until nearly full speed is reached, after which point the friction clutch comes automatically into operation so as to apply the power of the motor to the driven shaft. It has been found however that centrifugal friction clutches sometimes engage too early, so that the load is applied before the motor has reached full speed, with the result that the motor then runs at reduced speed and excessive heating of motor and clutch results. On the other hand a centrifugal friction clutch is unreliable because the frictional effect may decrease with wear, so that the clutch slips for an extended period causing further wear, heating and failure.

By means of my improved hydraulic coupling the driving motor is permitted to start against light load, and to run up to nearly full speed before the desired starting torque is applied hydraulically at a predetermined rate through the medium of said coupling.

In the accompanying drawings, there is shown for purposes of illustration, various forms of couplings embodying the invention, in which Figs. 1 and 3 are sections through a coupling in which a reservoir chamber and admission and exhaust ducts for the working liquid are associated with the driven member.

Fig. 2 shows a coupling in which the reservoir chamber and the admission ducts for the operating circuit are associated with the driving member while the exhaust duct is associated with the driven member, and Fig. 4 is a section through a coupling having a driving member, the reservoir chamber of which is partially bounded by the walls of a pulley on the driven member, the arrangement having a novel lubricating system.

Like reference characters denote like parts in the several figures of the drawings.

In the specific construction shown in Fig. 1 there is provided a driving shaft 10 having rotatably associated therewith a primary pump element or driving member 11 constituted by an outer dished ring 12 and an inner dished ring 13, these rings being joined together by a plurality of vanes 14. The secondary turbine element or driven part of the coupling includes an outer dished ring 15, and an inner dished ring 16 joined together by vanes similar to vanes 14 and rotatably associated with a driven shaft 17. The dished rings 13 and 16 are juxtaposed to conjointly form a core or guide ring in the center of the operating circuit of the fluid, the fluid in said circuit normally traveling around said core in the direction indicated in Fig. 1. The dished ring 13 has the portion thereof furthest from the center of the coupling turned inwardly toward the center of said coupling to form an annular channel-shaped collecting chamber 18. The portion of the dished ring 16 furthest from the center of the coupling is shortened to permit the inwardly turned portion of the ring 13 to lie in close relationship to the inside radial edges of its vanes.

Mounted on the dished member 15 is a member 20 which defines with said dished member, a reservoir chamber 21. The boss or hub portion of this member may be joined to or packed with regard to the shaft 17 to seal said chamber 21. In order to enclose the driven member 15 and the chamber 21 and to retain the working fluid, an outer casing 21a is provided with suitable bearings to support the shaft 17 and connected to the driving portion of the coupling.

In order to effect communication between the interior of the core rings and the reservoir chamber 21, there is provided one or more ducts 22, each of which has one end thereof passing through the ring 15 into the interior of the chamber 21, and the other end of which terminates in a scoop arm 23 disposed for example in the collecting chamber 18, that is to say, in the neighborhood of the circular axis of the annular working circuit chamber and opens in a direction contrary to the direction of rotation of the driving shaft 10. Vent pipes 24 are advantageously provided between the interior of the core ring and near the center of the reservoir chamber 21. Due to centrifugal action, the collection of air in the circuit will be near the core and in the reservoir near its center so that the location of the open ends of the vent pipes between these two points will insure efficient venting action.

In the operation of the construction shown in Fig. 1, assuming that the coupling is at rest and that the prime mover connected to the shaft 10 is also at rest, and that the shaft 17 is also at rest, the reservoir chamber 21 is full or nearly full, and the working circuit of the coupling is only partially full. The reservoir chamber 21 may be made of lesser capacity than the working fluid circuit so that while the coupling is operating and the driven member is rotating, partial filling of the working circuit is always assured, further emptying of the working circuit not being possible after the reservoir chamber 21 has been filled. When the driving member is rotating and the driven member is stationary, liquid will tend to pass out of the reservoir chamber 21 into the working circuit by the action of gravity. However, when the driving member has reached a certain number of revolutions, the scoop action of the ducts 22 will keep the reservoir chamber full of liquid. With further acceleration of the driving shaft the driven shaft will be carried around with it due to the circulation of the liquid in the operating circuit, this action taking place sooner or later, according to the load on the shaft. With a further increase in the number of revolutions in the driving shaft, the number of revolutions of the driven shaft will also increase. The rotation of the driven member will cause a corresponding rotation of the reservoir chamber 21, thereby causing the liquid therein to be forced under centrifugal pressure into the interior of the duct 22.

Due to the partial filling of the working circuit of the coupling and the circulation of the liquid in said circuit, a condition of relatively low pressure will prevail in the interior of the core ring, thereby permitting the fluid to pass therein from the reservoir chamber. As a result of this influx of liquid into the operating circuit, the slip will decrease, and consequently the coefficient of transmission of the coupling will be increased so that the number of revolutions of the driven shaft will increase still further. Under these conditions more liquid will be forced into the circuit again and this will continue until the circuit is completely filled and the most favorable slip attained.

If the number of revolutions of the driven shaft should decrease to a low value, the centrifugal pressure of the liquid in the duct 22 will decrease and the liquid will be scooped out of the circuit by the scoop arms 23 and passed through the duct 22 into the reservoir chamber 21, thereby partially emptying the operating circuit, the scooping action being assisted by the centrifugal force acting on the liquid in the collecting chamber 18. The emptying of this circuit causes an increase in the slip between the driving and driven member and corresponding diminution of the coefficient of transmission. The more nearly the driven shaft approaches a standstill and the greater the difference in speed between the driving and driven shaft, the greater will the scooping action of the duct 22 be. This slip increases until the driven shaft becomes stationary and the driving shaft continues to rotate, and the torque transmitted will then depend on the speed of the engine and the quantity of liquid remaining in the working chamber.

The above described functions also occur during the various intermediate operating stages inasmuch as the impelling liquid is either delivered from the reservoir to the working circuit or vice versa with a consequent change of slip according to the difference between the number of revolutions of the driving and driven shaft.

In order to improve the influx of the liquid into the interior of the guide ring, said ring may be made slightly open towards the center, and the free space between the long vanes on the driving and driven members is increased from the center of the shaft outwardly towards the interior of the guide ring or pocket 18.

The liquid circulating around the core has a radial component which urges the liquid outwardly between the open space of the core rings and into the pocket 18. While the driving member is rotating, the pocket 18 is always filled with liquid irrespective of the amount of liquid in the circuit, so that as the liquid is withdrawn through the scoop arms 23 and duct 22, fresh liquid passes therein to replace it.

Fig. 2 shows an arrangement which includes a driving cover 24a connected to the driving shaft 25 and fixed to the primary or pump element 24b and a secondary turbine or driven member 26 connected to a driven shaft 27. In this arrangement a reservoir chamber 30 is rotatably associated with the driving portion 24b of the coupling. Separate ducts are provided for the admission and discharge of the working liquid, said liquid being fed into the circuit through ducts 31 disposed between the reservoir chamber 30 and the interior of the core ring. This duct 31 is advantageously provided with a valve 32 for controlling the passage of liquid therethrough.

The discharge of liquid from the working circuit takes place through radially extending conduits 33 communicating with reservoir 30 through axial bores 34 in the driven shaft 27. These conduits 33 terminate at the free end thereof in scoop arms 35 disposed in a collecting chamber 36 formed in the core ring and open in the contrary direction to the direction of rotation of the coupling. The filling proceeds here in a manner similar to Fig. 1, only that in this case the reservoir chamber continuously forces liquid into the circuit at a rate dependent on the speed of the driving half, while the scooping of the liquid and its return to said chamber will take place according to the difference between the number of revolutions of the driving and driven members. In this arrangement a continuous flow through the apparatus may take place.

In this case moreover the reservoir chamber 30 is arranged about one of the shafts, and so as to reduce dead space and consequently also the amount of liquid necessary for working the coupling, the external diameter of the reservoir 30 is made approximately equal to the smallest diameter of the operating circuit. In this way, when the operating circuit is completely filled there will be only quite a small quantity of the liquid in the collecting chamber, and theoretically may be none.

In the form of coupling shown in Fig. 3 the reservoir chamber 38 is similar in construction and similar in relative size to the reservoir chamber 30 shown in Fig. 2 except that a connection 39 between said reservoir and the interior of the core ring acts both as a feed and exhaust duct for the liquid of the operating circuit in a manner similar to that shown in Fig. 1.

In the specific form shown in Fig. 4, a primary shaft 40 is provided which is connected to a shaft 41 which in turn has secured thereto a driving member 42. Cooperating with this driving member 42 is a driven member 43 which has fastened thereto a pulley 44 or other rotatable means such as a gear for transmitting power. This pulley defines with the walls of the driven member 43, a reservoir 45 communicating with the interior of the core ring by means of a duct or ducts 46. The driven member also has connected thereto a dished member 47 which serves as an outside casing therefor, and which is provided with a stub shaft 48 suitably journaled in a bracket 49.

It is advantageous in these couplings to use a working liquid which will act to lubricate the various portions of the coupling. For instance, in Fig. 4 there is shown a system for utilizing this impelling fluid for lubricating purposes. For that purpose, the shaft 41 is provided with an axial bore 51 which has communication at one end thereof with the operating circuit of the coupling through passages 52 and 53. A thrust bearing surface 54 between the dished members 42 and 47 is interposed between the two passages 52 and 53. Due to the centrifugal pressure resulting from the circulation of liquid between the driving and driven halves, the impelling liquid of the circuit is forced through these bearing surfaces and lubricates them.

Connecting the axial bore 51 with the outer periphery of the shaft 41 are bores 55a and 55 which serve to lubricate the thrust bearing portions 51a between the coupling members 42 and 43 and the bearing between the hub of the pulley 44 and the periphery of the shaft 41. In this manner the impelling pressure of the circuit is utilized for effecting forced lubrication.

Insofar as concerns the novel feature of my invention involved in the positioning of the scoop tubes in the working chamber itself, it will be apparent that the reservoir need not be connected to either member or contained within the coupling, but may be situated externally and stationary. The mounting of the reservoir in the coupling is important, the novel feature involving the use of centrifugal pressure on the liquid in the reservoir for returning the liquid to the working chamber and the elimination of additional glands, packings and outside pipe connections.

Having thus described my invention, what I claim as new and desire to secure by Letters Patent is:

1. A hydraulic coupling including a rotatable driving and a rotatable driven member, said members conjointly defining a fluid operating circuit, a core ring in said circuit shaped to form an annular chamber for collecting liquid therein, a reservoir chamber rotatably connected to one of said members, a duct carried by one of said members and connecting said reservoir chamber and the collecting chamber of said core ring, said duct having one end disposed within said collecting chamber and constituting a scoop.

2. A hydraulic coupling of the kinetic type including a rotatable driving member, a rotatable driven member, a reservoir chamber connected for rotation with said driven member, said chamber having a peripheral wall which serves for the transmission of driving torque delivered by said coupling, and a duct leading from said reservoir chamber to the interior of the liquid working circuit of said members.

3. A hydraulic coupling of the Föttinger type including a rotatable driving member, a rotatable driven member, a core ring in the liquid working circuit including said members, a reservoir chamber connected for rotation with said driven member, and a duct leading from the greater diameter of said reservoir chamber to the interior of said core ring.

4. A hydraulic coupling of the Föttinger type, including rotatable driving and driven members defining a liquid working circuit, a core ring in said circuit shaped to form an annular chamber for collecting impelling liquid therein when the coupling is operating, a reservoir chamber connected for rotation with one of said members, a filling duct leading from said reservoir chamber to a point of low pressure in the neighborhood of said core ring, and a separate evacuating duct leading from said collecting chamber to said reservoir chamber.

5. A hydraulic coupling including a driving member, a driven member, a core ring in the liquid working circuit for collecting impelling liquid therein while the coupling is operating, a reservoir, a filling duct leading from said reservoir to the interior of said circuit, means for retarding the flow through said filling duct, and a separate exhaust duct leading from said collecting chamber to said reservoir.

6. A hydraulic coupling of the Föttinger type, including a rotatable driving member, a rotatable driven member, a reservoir chamber mounted for rotation with one of said members, and a duct mounted for rotation with said driven member, leading from the greater diameter of said reservoir chamber to the neighborhood of the core of the liquid circuit including said members, whereby the impelling liquid is delivered at a point of low pressure within said working circuit through said duct by the action of centrifugal force.

7. A hydraulic coupling of the Föttinger type, including a rotatable driving member, a rotatable driven member, a collecting chamber within the liquid circuit produced by said members, and a duct connected for rotation with one of said members, rotatable relative to said collecting chamber, and debouching from the interior thereof, whereby liquid is removed from said liquid circuit at a rate dependent upon the relative speeds of rotation of said members.

8. A hydraulic coupling including a rotatable driving member, a rotatable driven member, a core ring in the liquid circuit of said members and shaped to form an annular chamber for collecting liquid therein while the coupling is operating, a reservoir connected for rotation with one of said members, and a duct rotatable relative to said annular chamber whereby liquid is removed from said chamber to the reservoir.

9. A hydraulic coupling including a rotatable driving member, a rotatable driven member, a core ring in the liquid circuit, a reservoir chamber connected for rotation with one of said members, a duct carried by the other of said members and leading from the interior of said core ring to said reservoir chamber.

10. A hydraulic coupling including a rotatable driving member, a rotatable driven member, a core ring in the liquid circuit, a reservoir chamber connected for rotation with one of said members, a vent pipe leading from the interior of said core ring to a point proximate the center of rotation of said reservoir chamber, and a duct leading from the greater diameter of said reservoir chamber to the working circuit.

11. A hydraulic coupling including a rotatable driving member, a rotatable driven member, an annular working circuit including said members, a reservoir chamber axially mounted with respect to said coupling and connected to one of said members for rotation therewith, said reservoir chamber having an external diameter which is approximately equal to the smaller internal diameter of said annular circuit, and a duct leading from the interior of said reservoir chamber and projecting into said annular circuit so as to open at a point of low pressure near the circular axis thereof, said duct being shaped to engage liquid within the working circuit, and, by employing the energy of motion of said liquid to transfer liquid from said circuit to said reservoir chamber.

12. A hydraulic coupling including a rotatable driving member, a rotatable driven member, a reservoir chamber connected for rotation with one of said members, a duct leading from said reservoir chamber into the interior of the liquid circuit of said members, and a pulley forming the peripheral wall of said reservoir chamber.

13. A hydraulic coupling including a rotatable driving member, a rotatable driven member, a reservoir chamber axially mounted with respect to the coupling and connected for rotation with one of said members, said reservoir chamber having a peripheral wall which is accessible for transmission of power therethrough, and a duct leading from said reservoir chamber to the interior of the liquid circuit of said members.

14. A hydraulic coupling of the kinetic type, including rotatable driving and driven members forming an annular liquid working circuit, a reservoir chamber rotatably connected to one of said members, and a duct connected for rotation with said driven member leading from said reservoir chamber and opening within said annular circuit in the neighborhood of the circular axis thereof, whereby liquid is forced from said reservoir chamber to a point of low hydraulic pressure within said circuit by centrifugal force due to rotation of said driven member.

15. A hydraulic coupling including a shaft, a driving member, a driven member, said members having abutting surfaces, one of said members being secured to said shaft, and the other member being mounted for rotation on said shaft, a reservoir chamber axially mounted with respect to said coupling and connected for rotation with said last mentioned member and having a hub mounted on said shaft for relative rotational movement with respect therewith, said shaft having a bore, means for delivering lubricating liquid from the working circuit of said members to said bore, and means for delivering lubricating liquid from said bore to said circuit between said abutting surfaces.

16. A hydraulic coupling including a shaft, a driving member, a driven member, said members having abutting surfaces, one of said members being secured to said shaft, and the other member being mounted for rotation on said shaft, a reservoir chamber axially mounted with respect to said coupling and connected for rotation with said last mentioned member and having a hub mounted on said shaft for relative rotational movement with respect therewith, said shaft having a bore, means for delivering lubricating liquid from the working circuit of said members to said bore, and means for delivering lubricating liquid from said bore to said reservoir along the bearing of said hub on said shaft.

17. A hydraulic coupling of the kinetic type, including a rotatable driving member, a rotatable driven member, a collecting channel within the liquid circuit including said members and connected for rotation with said driving member, a reservoir chamber connected for rotation with said driving member, means connected for rotation with said driven member and communicating said chamber with said channel, whereby liquid is removed from said circuit at a rate dependent on the relative speed of rotation of said members, and a duct connected for rotation with said driving member and communicating said chamber with said circuit whereby liquid is forced into said circuit at a rate dependent on the speed of rotation of said reservoir chamber.

18. A hydraulic coupling of the kinetic type, including a rotatable driving member, a rotatable driven member, a collecting channel within the liquid circuit including said members and rotatable relative to said driven member, a reservoir chamber connected for rotation with one of said members, and means connected for rotation with said driven member and communicating said chamber with said channel, whereby liquid is removed from said circuit at a rate dependent on the relative speed of rotation of said members, or forced into said circuit at a rate dependent on the speed of rotation of said reservoir chamber.

19. A hydraulic coupling of the kinetic type, including a rotatable driving member, a rotatable driven member, a channel in the liquid working circuit for collecting impelling liquid therein while the coupling is operating, a reservoir mounted for rotation with one of said members, a filling duct leading from said reservoir to the interior of said circuit, and a separate exhaust duct leading from said collecting channel to said reservoir.

20. A hydraulic coupling of the kinetic type, including a rotatable driving member, a rotatable driven member, a collecting channel mounted for rotation with said driving member and disposed within the liquid circuit including said members, and a duct leading from said collecting channel to the outside of said circuit and mounted for rotation with said driven member, whereby liquid is removed from said liquid circuit at a rate dependent on the relative speed of rotation of said members.

21. A hydraulic coupling including a rotatable driving member, a rotatable driven member, an annular channel within the liquid circuit of said members and connected for rotation with said driving member for collecting liquid therein while the coupling is operating, a reservoir connected for rotation with one of said members, and a duct mounted for rotation with said driven member, whereby liquid is removed from said collecting channel to said reservoir at a rate dependent on the relative speed of rotation of said members.

22. A hydraulic coupling of the kinetic type, including a rotatable driving member, a rotatable driven member, a reservoir chamber connected for rotation with one of said members, a vent pipe projecting into the interior of the working circuit of said coupling and leading to a point proximate the center of rotation of said reservoir chamber, and a duct leading from the greater diameter of said reservoir chamber to the working circuit.

23. A hydraulic coupling of the kinetic type, including a working chamber containing a rotatable driving member and a rotatable driven member, a reservoir chamber, and a duct connected for rotation with said driven member for engaging liquid within said working chamber, and by employing the energy of motion of said liquid, withdrawing liquid from said working chamber to said reservoir chamber, said duct being so disposed that the withdrawal of liquid thereby is opposed by centrifugal force due to the rotation of said driven member.

24. A hydraulic coupling of the kinetic type, including a working chamber containing a rotatable driving member and a rotatable driven member, and means connected for rotation with one of said members for engaging liquid within the other of said members and withdrawing it from said working chamber.

25. A hydraulic coupling of the kinetic type, including a rotatable driving member, a rotatable driven member, a collecting channel within the liquid circuit including said members and rotatable relative to said driven member, a reservoir chamber connected for rotation with said driven member, and means connected for rotation with said driven member and communicating said reservoir chamber with said channel, whereby liquid is removed from said circuit at a rate dependent on the relative speeds of rotation of said members or forced into said circuit at a rate dependent on the speed of rotation of said driven member.

26. A hydraulic coupling of the kinetic type, including a rotatable driving member, a rotatable driven member, a filling duct rotatably connected to one of said members for conducting liquid to the working circuit under the action of centrifugal force, and means rotatable with one of said members for engaging liquid contained within a part of the coupling rotatable with the other of said members, and thereby exhausting liquid from said circuit at a rate dependent on the relative speed of rotation of said members.

27. A hydraulic coupling of the kinetic type, having a working circuit including a rotatable driving member coaxial with a rotatable driven member, a reservoir chamber rotatably connected to one of said members, and a duct connecting said chamber with the interior of said circuit and attached to one of said members for rotation therewith, said duct opening into said circuit in a direction having a component tangential to a circle concentric with the axis of said members.

28. A hydraulic coupling of the kinetic type, including driving and driven members, an annular channel formed on the one of said members for collecting liquid therein while the coupling is operating, and a duct carried by the other of said members and opening beneath the operating surface level of liquid within said channel, said duct leading to the outside of the circuit of said coupling.

29. A hydraulic coupling of the kinetic type, including a driving member and a driven member, said members being coaxially disposed, a duct carried by one of said members, said duct leading from outside the circuit of said members and opening into the interior thereof in a direction having a component tangential to a circle concentric with the axis of said members.

30. A hydraulic coupling of the kinetic type, comprising a rotatable driving member, a rotatable driven member, a reservoir chamber connected for rotation with said driven member, a duct carried by said driven member, one end of said duct opening into said reservoir chamber and the other end thereof extending into the liquid within said driving member and being shaped to engage said liquid and to remove said liquid therefrom.

31. A hydraulic coupling comprising in combination a primary rotor, blades on said primary rotor for setting a liquid in motion in a closed circuit, a secondary rotor driven by said liquid, blades on said secondary rotor disposed immediately adjacent the blades on said primary rotor, two rings of curved cross-section each carried by the blades of one of the rotors and constituting a two-part vortex ring around which the liquid circulates, a reservoir for said liquid centrally disposed and rotating with one of said rotors, and at least one passage connecting said reservoir with the interior of said vortex ring, said passage extending across but not communicating with the said circuit.

32. A hydraulic coupling of the kinetic type, comprising a pair of rotatable driving and driven dished rings juxtaposed to form an annular working circuit chamber and each provided with vanes for engaging working liquid, a rotatable casing member disposed at the side of one of said rings remote from the other of said rings, there being formed a reservoir space between said casing member and said first mentioned one of said rings, sealing means serving to maintain substantially constant the combined liquid content of said working circuit chamber and said reservoir space while the coupling is operating, and a duct carried by said first mentioned one of said rings and leading from said reservoir space to a point in the neighborhood of the circular axis of said circuit chamber.

HAROLD SINCLAIR.